(12) United States Patent
Todd et al.

(10) Patent No.: US 10,394,793 B1
(45) Date of Patent: *Aug. 27, 2019

(54) METHOD AND SYSTEM FOR GOVERNED REPLAY FOR COMPLIANCE APPLICATIONS

(71) Applicant: EMC IP Holding Company LLC, Hopkinton, MA (US)

(72) Inventors: Stephen J. Todd, Shrewsbury, MA (US); Said Tabet, Natick, MA (US); Nikhil Sharma, El Dorado Hills, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/755,627

(22) Filed: Jun. 30, 2015

Related U.S. Application Data

(63) Continuation-in-part of application No. 14/610,191, filed on Jan. 30, 2015, now Pat. No. 9,594,546.

(51) Int. Cl.
  *G06F 11/07* (2006.01)
  *G06F 16/23* (2019.01)
  *H04L 29/08* (2006.01)

(52) U.S. Cl.
  CPC ...... *G06F 16/2322* (2019.01); *G06F 11/0709* (2013.01); *G06F 11/079* (2013.01);
  (Continued)

(58) Field of Classification Search
  CPC ..... G06F 8/10; G06F 11/0709; G06F 11/3466
  See application file for complete search history.

(56) References Cited

U.S. PATENT DOCUMENTS 7,343,601 B2   3/2008 Azagury et al.
7,752,437 B1   7/2010 Thakur et al.
(Continued)

OTHER PUBLICATIONS

P. Banerjee et al., "The Future of Cloud Computing: An HP Labs Perspective," HP Labs Technical Reports, Dec. 2010, 11 pages.
(Continued)

*Primary Examiner* — Wei Y Zhen
*Assistant Examiner* — Brahim Bourzik
(74) *Attorney, Agent, or Firm* — Ryan, Mason & Lewis, LLP

(57) ABSTRACT

Example embodiments of the present invention relate to methods, a system, and a computer program product for performing governed replay for compliance applications. The method includes maintaining a repository and executing an audit, including a control and one or more processes, to determine compliance of a state of the cloud infrastructure environment. The method further includes storing in the repository a control metadata object including content addresses to the processes for the audit as an immutable control and process objects, respectively, storing in the repository input metadata and output metadata identifying inputs to and outputs from the control and the processes as immutable input metadata objects and output metadata objects, respectively, and storing a timestamp metadata object, including a timestamp and content addresses to the control object, the process objects, the input objects, and the output objects, as an immutable metadata object in the repository.

20 Claims, 18 Drawing Sheets

(52) U.S. Cl.
CPC ...... *G06F 11/0751* (2013.01); *G06F 16/2365* (2019.01); *H04L 67/10* (2013.01)

(56) References Cited

U.S. PATENT DOCUMENTS

| | | | |
|---|---|---|---|
| 8,010,426 | B2 | 8/2011 | Kopp et al. |
| 8,671,449 | B1 | 3/2014 | Nachenberg |
| 8,706,692 | B1 | 4/2014 | Luthra et al. |
| 8,756,656 | B1 | 6/2014 | Hartmann |
| 8,893,293 | B1 | 11/2014 | Schmoyer et al. |
| 8,904,299 | B1 | 12/2014 | Owen et al. |
| 8,972,564 | B1 | 3/2015 | Allen |
| 9,256,656 | B2 | 2/2016 | Fankhauser et al. |
| 9,727,591 | B1 | 8/2017 | Sharma et al. |
| 9,805,213 | B1 | 10/2017 | Kragh |
| 2003/0055898 | A1 | 3/2003 | Yeager et al. |
| 2004/0243692 | A1 | 12/2004 | Arnold et al. |
| 2005/0033980 | A1 | 2/2005 | Willman et al. |
| 2005/0108703 | A1 | 5/2005 | Hellier |
| 2006/0155738 | A1 | 7/2006 | Baldwin et al. |
| 2006/0161444 | A1 | 7/2006 | Lubrecht et al. |
| 2008/0083031 | A1 | 4/2008 | Meijer et al. |
| 2008/0091747 | A1 | 4/2008 | Prahlad et al. |
| 2008/0104060 | A1 | 5/2008 | Abhyankar et al. |
| 2008/0107037 | A1 | 5/2008 | Forbes et al. |
| 2008/0134332 | A1 | 6/2008 | Keohane et al. |
| 2009/0016534 | A1* | 1/2009 | Ortiz Cornet ........... G06F 21/64 380/277 |
| 2010/0058054 | A1 | 3/2010 | Irvine |
| 2010/0076987 | A1 | 3/2010 | Schreiner |
| 2010/0106558 | A1 | 4/2010 | Li et al. |
| 2010/0250867 | A1* | 9/2010 | Bettger ............. G06F 17/30587 711/152 |
| 2010/0332530 | A1 | 12/2010 | McKelvie et al. |
| 2011/0047056 | A1 | 2/2011 | Overman et al. |
| 2011/0126197 | A1* | 5/2011 | Larsen .................. H04L 9/3213 718/1 |
| 2011/0153727 | A1 | 6/2011 | Li |
| 2011/0179110 | A1 | 7/2011 | Soloway |
| 2011/0191562 | A1 | 8/2011 | Chou et al. |
| 2011/0225276 | A1 | 9/2011 | Hamilton, II et al. |
| 2011/0231899 | A1 | 9/2011 | Pulier et al. |
| 2011/0246653 | A1 | 10/2011 | Balasubramanian et al. |
| 2012/0066487 | A1 | 3/2012 | Brown et al. |
| 2012/0254115 | A1 | 10/2012 | Varadharajan |
| 2012/0284713 | A1 | 11/2012 | Ostermeyer et al. |
| 2013/0305376 | A1 | 11/2013 | Chauhan et al. |
| 2014/0019423 | A1 | 1/2014 | Liensberger et al. |
| 2015/0127660 | A1 | 5/2015 | Zilberberg et al. |
| 2015/0220649 | A1 | 8/2015 | Papa et al. |
| 2015/0286697 | A1 | 10/2015 | Byrne et al. |
| 2015/0347264 | A1* | 12/2015 | Mohammed ........ G06F 11/3006 714/45 |
| 2015/0373049 | A1 | 12/2015 | Sharma et al. |
| 2015/0378788 | A1 | 12/2015 | Roese et al. |
| 2016/0012239 | A1* | 1/2016 | Brucker ................ G06F 21/552 726/16 |
| 2016/0267082 | A1 | 9/2016 | Wong et al. |
| 2016/0371396 | A1 | 12/2016 | Todd et al. |
| 2016/0380913 | A1* | 12/2016 | Morgan .................. H04L 41/12 709/226 |

OTHER PUBLICATIONS

C. Dai et al., "An Approach to Evaluate Data Trustworthiness Based on Data Provenance," Proceedings of the 5th VLDB Workshop on Secure Data Management (SDM '08), Aug. 2008, pp. 82-98.

P. De Leusse et al., "Toward Governance of Cross-Cloud Application Deployment," Second Optimising Cloud Services Workshop, Mar. 2012, 12 pages.

A. Gehani et al., "Mendel: Efficiently Verifying the Lineage of Data Modified in Multiple Trust Domains," Proceedings of the 19th ACM International Symposium on High Performance Distributed Computing (HPDC '10), Jun. 2010, 13 pages.

M.T. Jones, "Anatomy of a Cloud Storage Infrastructure," http://www.ibm.com/developerworks/cloud/library/cl-cloudstorage, Nov. 2010, 7 pages.

P. Mell et al., "The NIST Definition of Cloud Computing," U.S. Department of Commerce, Computer Security Division, National Institute of Standards and Technology, Special Publication 800-145, Sep. 2011, 7 pages.

S. Pearson, "Privacy, Security and Trust in Cloud Computing," HP Labs Technical Reports, Jun. 2012, pp. 1-57.

U.S. Appl. No. 14/610,191 filed in the name of Stephen Todd et al. on Jan. 30, 2015 and entitled "Governed Application Deployment on Trusted Infrastructure."

U.S. Appl. No. 14/674,121 filed in the name of Stephen Todd et al. on Mar. 31, 2015 and entitled "Lineage-Based Veracity for Data Repositories."

EMC, "EMC Centera Content—Addressable Storage—Archiving Made Simple, Affordable and Secure," http://www.emc.com/collateral/hardware/data-sheet/c931-emc-centera-cas-ds.pdf, May 2013, 4 pages.

Broadband Properties, "Cloud Computing and Sustainability," Green Networking, Jan./Feb. 2011, pp. 74-79.

U.S. Appl. No. 14/744,886 filed in the name of Marina Zeldin et al. Jun. 19, 2015 and entitled "Infrastructure Trust Index."

* cited by examiner

US 10,394,793 B1

METHOD AND SYSTEM FOR GOVERNED REPLAY FOR COMPLIANCE APPLICATIONS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is a continuation-in-part of U.S. patent application Ser. No. 14/610,191 entitled "GOVERNED APPLICATION DEPLOYMENT ON TRUSTED INFRASTRUCTURE" filed on Jan. 30, 2015 the teachings of which application are hereby incorporated herein by reference in their entirety.

TECHNICAL FIELD

The field relates generally to cloud infrastructure environments, and more particularly to governed deployment of one or more applications on trusted infrastructure of a cloud infrastructure environment.

BACKGROUND

Many data centers in use today employ a cloud computing paradigm. As is well known, the cloud computing paradigm is a model that provides ubiquitous, convenient, on-demand network access to a shared pool of configurable computing resources (e.g., networks, servers, storage, applications, and services), as part of a cloud infrastructure, that can be rapidly provisioned and released with minimal management effort or service provider interaction (see, e.g., NIST Special Publication No. 800-145).

Further, data repositories create a centralized location for data that can facilitate agile business or other queries and analytics by leveraging a diverse variety of data sources in order to produce business or other insight. Some common types of data repositories that a business or some other entity may maintain include, but are not limited to, data lakes, data warehouses, and data marts. A data lake is typically considered to be a centralized data storage system for structured and unstructured data. A data warehouse is typically considered to be a centralized data storage system for integrated data from one or more disparate sources. A data mart is typically considered to be a simpler data warehouse focused on a single subject.

Applications and their corresponding data sets are undergoing more scrutiny by outside auditors than ever before due to governmental regulations, cyber-attacks, and consumer trust demands. An enterprise may use Governance, Risk, and Compliance (GRC) tools to provide compliance dashboards that report the end result of internal audits. These reports are then given to various governing bodies to prove compliance. Further, there may be internal employees that wish to revisit scenarios and process interactions, especially those that involve multiple data sources, with an ability to drill down into specific metadata involved in a previous event.

SUMMARY

Example embodiments of the present invention relate to methods, a system, and a computer program product for performing governed replay for compliance applications. The method includes maintaining a repository and executing an audit, including a control and one or more processes, to determine compliance of a state of the cloud infrastructure environment. The method further includes storing in the repository a control metadata object including content addresses to the processes for the audit as an immutable control and process objects, respectively, storing in the repository input metadata and output metadata identifying inputs to and outputs from the control and the processes as immutable input metadata objects and output metadata objects, respectively, and storing a timestamp metadata object, including a timestamp and content addresses to the control object, the process objects, the input objects, and the output objects, as an immutable metadata object in the repository.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
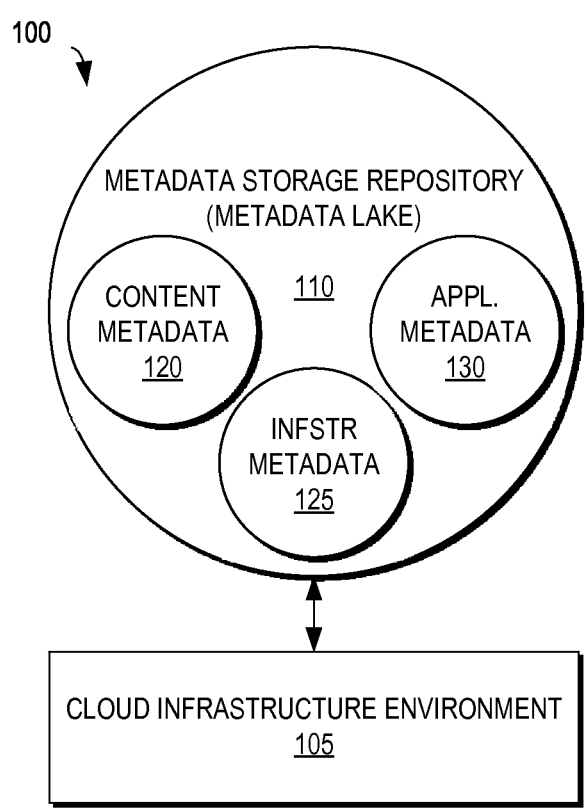
FIG. 1 is a block diagram illustrating a metadata storage repository for use with a cloud infrastructure environment to enable governed deployment of one or more applications on trusted infrastructure of the environment, according to an example embodiment of the present invention.

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" generally refers to one or more software programs designed to perform one or more functions; "metadata" generally refers to data that describes or defines other data; "governed placement" generally refers to constraining deployment of an application on specific infrastructure that is trusted; and "trusted" generally means satisfying (or at least substantially satisfying) or being consistent with one or more trust-based criteria (e.g., policies, requirements, regulations, etc.).

It is realized herein that limitations of existing application deployment approaches have to do with these existing approaches' failure to recognize the importance of data and metadata governance in entities such as large corporations. While the automated deployment of applications continues to be critical, embodiments of the invention have been developed based on the realization that there is a need/desire to constrain application deployment to run on top of specific trusted and compliant infrastructure, as well as a need/desire to subsequently discover such trusted infrastructure for analytic queries.

Application deployment via PaaS tools, such as Cloud-Foundry® and, as another example, OpenShift® (Red Hat, Inc. of Raleigh, N.C.), typically limit the deployment of an application to a specific cloud, without understanding the capabilities of the underlying infrastructure. A typical cloud selection process for deploying an application, illustrated using CloudFoundry as an example, is as follows:

1—deploy <my cloud>
2—target <my cloud>
3—push <my app>
4—bind <my services>
5—instances <my app>+100
6—add capacity <my cloud>

In this example, the data center operator that manages the cloud infrastructure issues commands 1 and 6 of the process, while the application developer issues commands 2 through 5. Thus, as is evident, the application developer is automatically assigned a cloud ("my cloud") which is some portion of the cloud infrastructure that constitutes a data center. The application developer can specify services that the application will need as well as how many instances of the application will run on the assigned cloud. The data center operator then issues commands to add resource capacity to the assigned cloud and to deploy the application instance(s) to the assigned cloud for execution.

However, as is evident from the above example, the existing PaaS deployment process has no mechanism for understanding the policies or regulatory requirements of an application that may need to result in constrained placement onto a specific cloud with a certain trusted infrastructure within that cloud. As mentioned above, such a constrained (or governed) placement may be needed/desired based on application criteria such as, but not limited to, policies, requirements, and other criteria relating to, e.g., financial services, data protection, data retention, government regulations, etc.

Even if a PaaS tool were to have disparate knowledge of specific trusted infrastructure and disparate knowledge of policy constraints of the application that it must place, existing PaaS tools have no ability to automatically and dynamically map those two pieces of information on the fly (real-time) at deployment time. Illustrative embodiments of the invention provide such mapping functionality.

Furthermore, it is realized herein that corporate discovery and analysis of data sets is hindered due to the fact that existing PaaS tools cannot be queried to discover specific data sets and the infrastructure onto which they have been assigned. This limits the ability of corporate personnel and officers (e.g., chief data officer) to quickly leverage data for business objectives. Illustrative embodiments of the invention provide such querying functionality.

It is also realized herein that the metadata that an existing PaaS tool such as CloudFoundry would need to solve the above problems is fragmented across disparate silos (of the underlying data center) and often difficult to access, implemented in various formats, and possibly with a different meaning within each silo. That is, due to the heterogeneous nature of the data needed to make the decision, as well as the disparate locations where such data is stored, existing PaaS tools are unable to perform governed deployment of one or more applications on trusted infrastructure of a cloud infrastructure environment.

Illustrative embodiments of the invention maintain a metadata storage repository called a "metadata lake" whereby metadata associated with the cloud infrastructure environment is collected for use in making governed placement decisions. For example, FIG. 1 illustrates a system 100 comprising a metadata storage repository 110 (also referred to as "metadata lake" 110) and a cloud infrastructure environment 105, wherein the repository 110 enables governed deployment of one or more applications on trusted infrastructure of the environment 105, as will be described in detail below. The metadata lake 110 informs a PaaS tool, such as, e.g., CloudFoundry and OpenShift, on the application and infrastructure metadata that provides for automated, governed deployment of applications onto a best-fit trusted infrastructure. This metadata lake 110 is accessible at both application deployment time as well as discovery time when a specific data storage unit or device needs to be discovered and analyzed.

The metadata lake 110 contains a combination of semantic (content) metadata 120, infrastructure-based metadata 125, and application metadata 130. Thus, metadata 120 is considered metadata associated with content associated with applications, metadata 125 is considered metadata associated with a cloud infrastructure environment in which the applications are deployable, and metadata 130 is considered metadata associated with the applications. The metadata lake 110 comprises a portal (e.g., one or more application programming interfaces or APIs, not expressly shown) that accept metadata 120 about semantic content (e.g., discovered, aggregated, or manually supplied), infrastructure-based metadata 125 (e.g., gathered automatically from software-defined data center interfaces and tools), and application metadata 130 (e.g. schemas, regulations, and policies supplied, by way of example only, by Chief Security Officers/Chief Data Officers/others) from various sources, systems, tools and/or processes, as will be further explained below.

It is to be appreciated that the phrase "cloud infrastructure environment" as illustratively used herein generally refers to an environment that comprises cloud infrastructure and a platform stack used for development, management, and deployment of applications hosted by computing resources that are part of the cloud infrastructure. The cloud infrastructure in one embodiment comprises an infrastructure-as-a-service (IaaS) approach with a plurality of clouds that form a plurality of data centers (e.g., software defined data centers or SDDCs). The platform stack in one embodiment comprises development and management layers that form a programming environment for an application developer, and a platform-as-a-service (PaaS) deployment layer to deploy developed applications.

Figure 2:
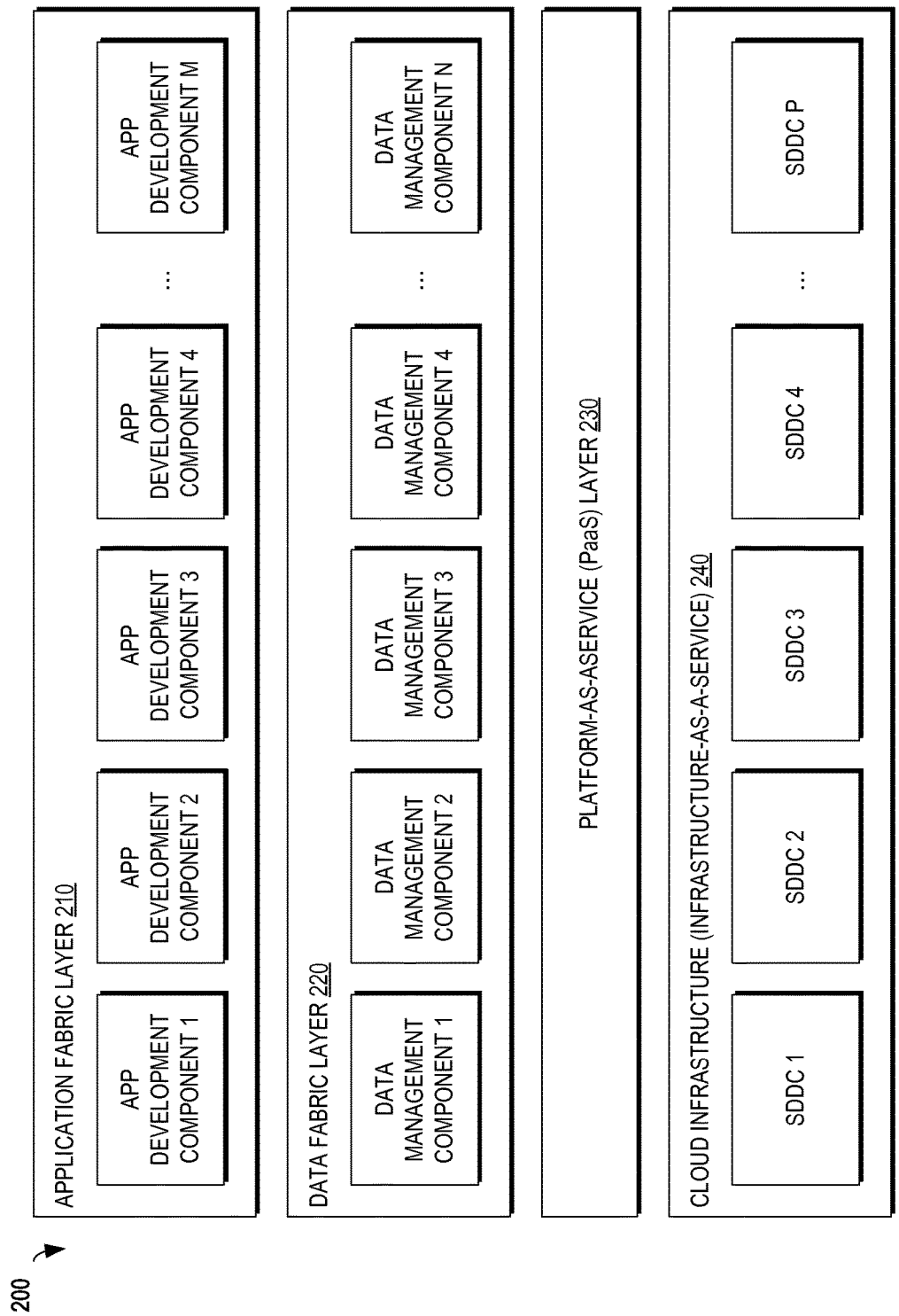
FIG. 2 is a block diagram illustrating a platform stack in a cloud infrastructure environment with platform-as-a-service functionality with which a metadata storage repository according to one or more example embodiments of the present invention can be implemented.

FIG. 2 illustrates one example of a platform stack in a cloud infrastructure environment with PaaS functionality with which a metadata storage repository according to one or more embodiments of the invention can be implemented. More specifically, system 200 in FIG. 2 illustrates one example of at least a portion of the environment 105 shown in FIG. 1. As shown, system 200 comprises an application fabric layer 210 with a plurality of application development components 1, 2, 3, 4, . . . M, a data fabric layer 220 with a plurality of data management components 1, 2, 3, 4, . . . N, a PaaS layer 230, and a cloud infrastructure 240 which utilizes an IaaS approach including a plurality of SDDCs 1, 2, 3, 4, . . . P. Each SDDC may comprise one or more clouds, each cloud having its own underlying infrastructure (by way of example only, networks, servers, storage devices, virtualization functionality including virtual machines and logical storage units, etc.).

As is known, while the PaaS layer controls deployment of an application to a specific platform (e.g., specific data center or cloud) and thus abstracts the application developer away from the underlying infrastructure of the data center/cloud where the application is to be deployed, IaaS can be used in illustrative embodiments to assist in selecting the underlying infrastructure.

It is to be appreciated that the application development components in the application fabric layer 210 may comprise any known application development tools depending on the specific applications to be developed and hosted on the data center. By way of example only, these application development tools may include one or more of: mobile software development tools from Xtreme Labs (part of Pivotal Software, Inc. of Palo Alto, Calif.); open source web application framework Rails® (David Heinemeier Hansson); Java Virtual Machine (JVM) based application development Spring® tools (Pivotal Software, Inc. of Palo Alto, Calif.); data intensive real-time application development system Node.js® (Joyent, Inc. of San Francisco, Calif.); and cloud application vFabric® platform (VMware, Inc. of Palo Alto, Calif.), just to name a few.

Likewise, the data management components in the data fabric layer 220 may comprise any known data management tools depending on the specific applications to be developed and hosted on a data center/cloud. By way of example only, these data management tools may include one or more of: massively parallel processing (MPP) structured query language (SQL) database Pivotal HD (Pivotal Software, Inc. of Palo Alto, Calif.); query interface software HAWQ® (Pivotal Software, Inc. of Palo Alto, Calif.); and data management software GemFire® (Pivotal Software, Inc. of Palo Alto, Calif.), just to name a few.

The PaaS layer 230 may comprise any known PaaS tool, by way of example as mentioned above, CloudFoundry and OpenShift. One or more other PaaS tools may be employed by the PaaS layer 230.

The cloud infrastructure layer 240, in one example, comprises a plurality of SDDCs. An SDDC is a data center design where elements of the infrastructure (e.g., including networking elements, storage elements, processing elements, and security elements) are virtualized and delivered as services (e.g., IaaS) to tenants. Typically, each SDDC is implemented via a specific cloud where part or all of infrastructure associated with the cloud is allocated to one or more tenants. A "cloud" generally refers to a portion of infrastructure and associated environment that operates in accordance with a cloud computing paradigm. It is to be appreciated, however, that alternative embodiments may be implemented with other types of data centers and processing platforms.

Figure 3:
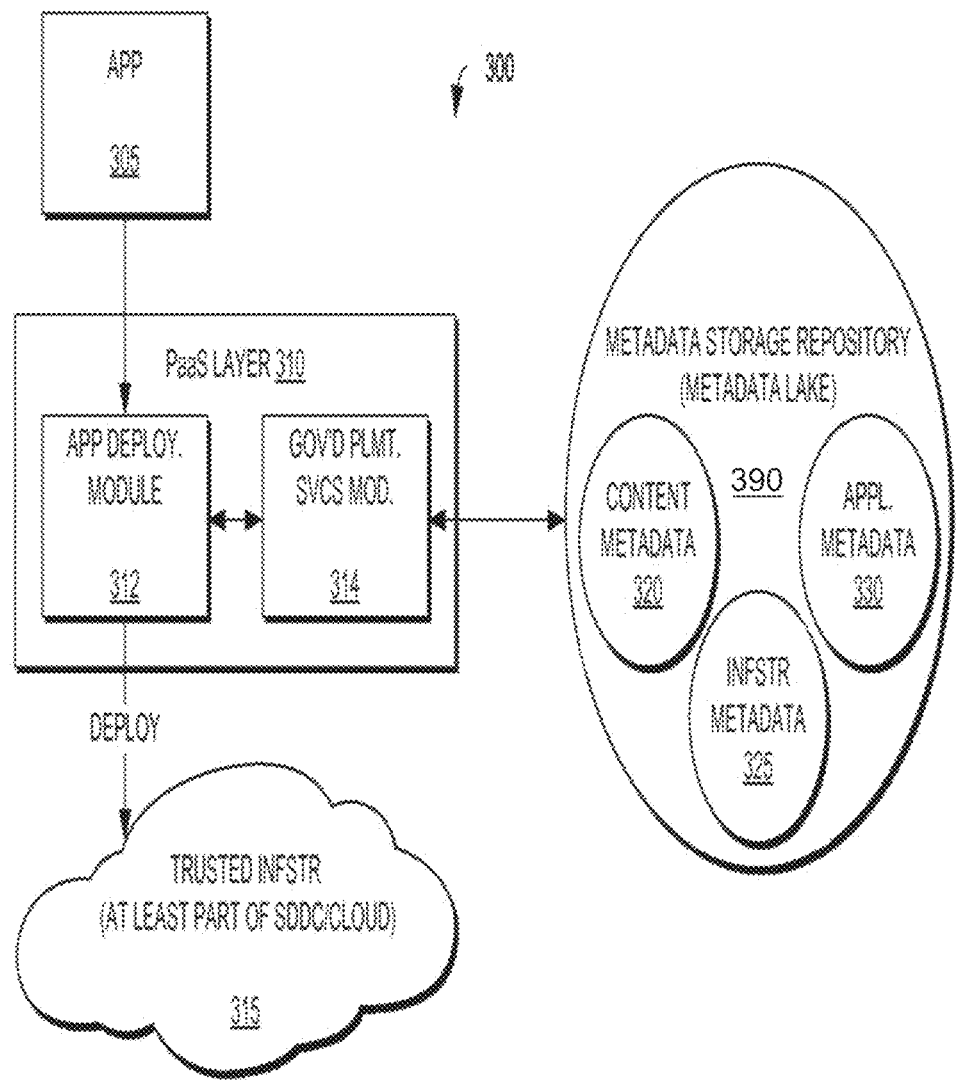
FIG. 3 is a block diagram illustrating application deployment via governed placement services according to an example embodiment of the present invention.

FIG. 3 illustrates application deployment via governed placement services according to an embodiment of the invention. As shown in system 300 of FIG. 3, an application 305 is provided to a PaaS layer 310. The PaaS layer 310 is one example of PaaS layer 230 (FIG. 2), and application 305 is an example of an application developed in accordance with application fabric layer 210 and data fabric layer 220 (FIG. 2). The application developer seeks to have application 305 deployed on trusted infrastructure due to some trust-based criteria such as policy, requirement, regulation, or the like, associated with the application. As explained above, existing PaaS tools are not able to take into account such trust-based criteria or identify which cloud infrastructure would be able to best satisfy such criteria, nor map the two pieces of information to one another.

In accordance with one embodiment, PaaS layer 310, in conjunction with metadata lake 390, is configured to determine a deployment for application 305 on a trusted infrastructure within the cloud infrastructure environment based on at least a subset of the metadata maintained in the metadata repository. This is accomplished with application deployment module 312 and governed placement services module 314. More particularly, a request to deploy application 305 is presented to application deployment module 312. Application deployment module 312 calls governed placement services module 314 which determines the deployment of application 305 based on a subset of the metadata (e.g., content metadata 320, infrastructure metadata 325, application metadata 330) stored in metadata lake 390 by mapping trust-based criteria (e.g., policies, requirements, regulations, etc.) associated with application 305 with a portion of infrastructure that satisfies the trust-based criteria, in this example, trusted infrastructure 315 which includes some portion or all infrastructure of an SDDC or cloud of the cloud infrastructure 240.

More particularly, governed placement services module 314 queries the metadata lake 390 for information useful in identifying placement on a trusted infrastructure. Governed placement services module 314 comprises logic configured to interpret one or more policies (e.g., corporate policies) for the application and map the one or more policies against available trusted infrastructure for the purpose of deploying the application and its associated data on top of the trusted infrastructure. Such logic can be encoded in various ways including, but not limited to, using semantic tools and rule-based declarative approaches. Illustrative embodiments will be described below.

Once a placement decision is made by governed placement services module 314, module 314 notifies application deployment module 312 which, in turn, deploys the application on the identified trusted infrastructure 315. The metadata lake 390 is also notified of the placement decision by module 314. Metadata lake 390 stores this information which serves as an audit trail for subsequent query services. The recording of this data may be done by tools such as a PaaS tool or an underlying SDDC entity.

It is to be appreciated that while system 300 of FIG. 3 shows governed placement services module 314 being internal to the PaaS layer 310, in alternative embodiments, all or part of the functionality of governed placement services module 314 may be implemented via the computing resources that implement metadata lake 390 and/or some other computing resources (not expressly shown) in communication with PaaS layer 310 and metadata lake 390.

Figure 4:
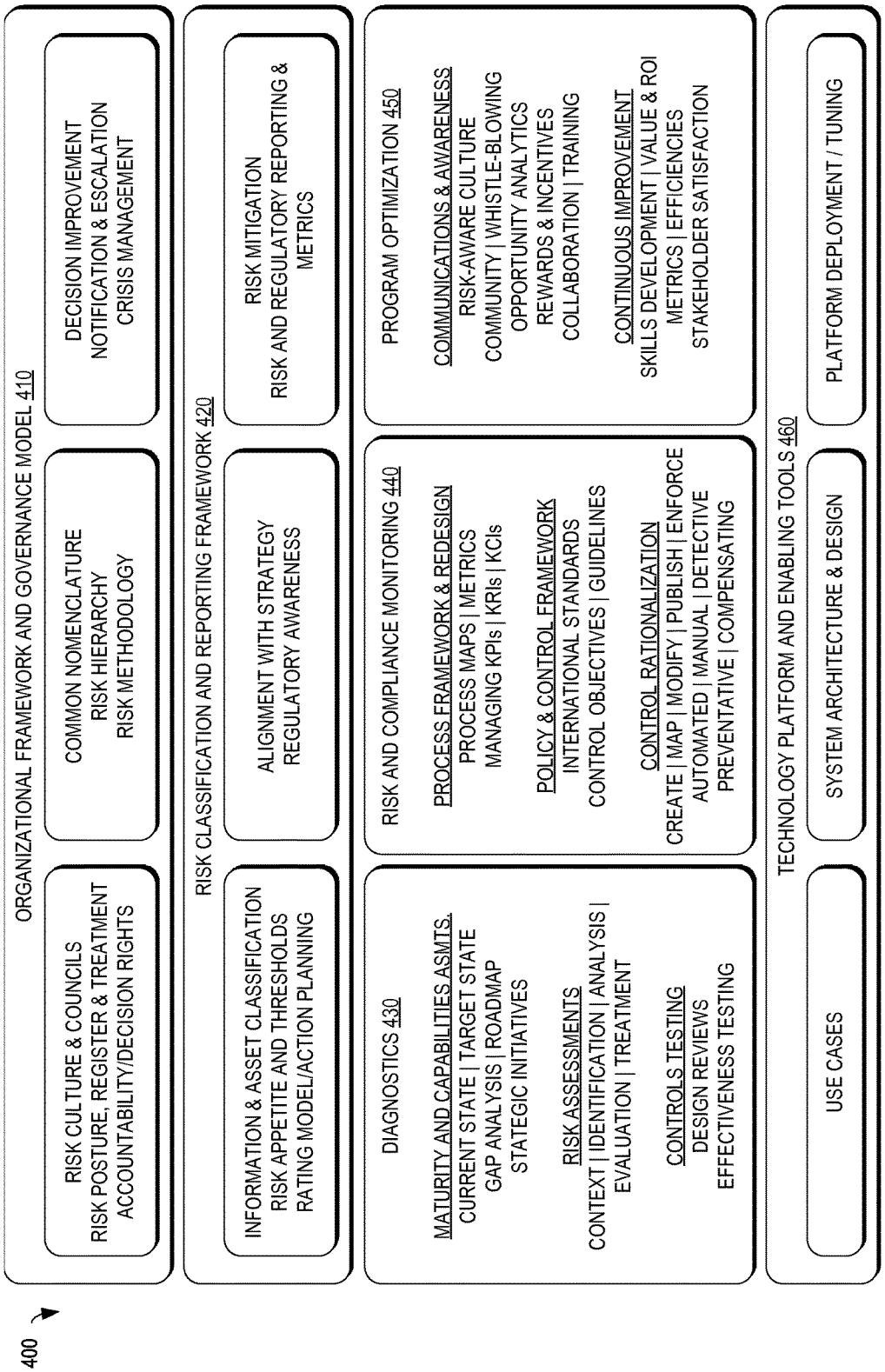
FIG. 4 is a block diagram illustrating a model of a typical GRC framework according to an example embodiment of the present invention.

FIG. 4 is a block diagram illustrating a model of a typical Governance, Risk, and Compliance (GRC) framework 400 according to an example embodiment of the present invention. A GRC framework 400 typically includes the following components:

1. Organizational Framework and Governance model 410—An active governance structure that drives accountability into the day-to-day operating fabric ensures business owners have the proper degree of granular visibility into risks that really matter. Armed with options on what to do about them, business owners can make intelligent decisions on what remediation efforts to fund.

2. Risk Classification and Reporting Framework 420—A set of rationalized processes for the prioritization of key risk and compliance requirements supports GRC reporting across the organization, and to the board. A practical categorization of risk types, threat communities, information, and data classification brings context to risk reporting and decision-making.

3. Diagnostics 430—Qualitative and quantitative assessments that follow a common risk and compliance identification and analysis process, supported by consistent controls reviews and testing, provide objective diagnostics required for meaningful decisions on treatment strategies.

4. Risk and Compliance Monitoring 440—Monitoring policies, controls, threats and vulnerabilities against standards and acceptable thresholds provides visibility into risk and compliance profiles on a consistent basis. Key Performance Indicators (KPIs), Key Risk Indicators (KRIs), Key Control Indicators (KCIs) provide early warning alerts that permit organizations to be proactive in their response.

5. Program Optimization 450—Continuous improvement, communication and awareness programs drive adaption as the external environment presents new and emerging risks and compliance requirements. Knowledge sharing across stakeholders on the appropriate best practices supports evolution to a target maturity level that is optimal for the organization.

6. Technology Platform and Enabling tools 460—A technology eco-system that supports a central, secure repository of requirements, policies, control standards, risk analysis, and control test results provides a solid foundation for streamlined workflow, analytics, and reporting.

GRC tools 460, such as RSA® Archer® by RSA Security, LLC of Bedford, Mass., the security division of EMC Corporation of Hopkinton, Mass., among other things, can perform automated audit of an infrastructure to ensure compliance. One way in which GRC tools typically work is to launch a series of workflows or scripts that gather a wide variety of inputs, examine the state of those inputs, confirm that the inputs conform to a set of governance thresholds or values, and then output a dashboard result (e.g., Green=PASS, Red=FAIL) based on said conformance. However, these dashboards suffer from a number of shortcomings:

1. No ability to request point-in-time compliance—The rationalized processes of the Risk Classification and Reporting Framework 420 do not have a "time dial" that can run these processes at a specific point in time in the past according to a state of the infrastructure at that time in the past.

2. No point-in-time inputs to compliance replay—In addition to the lack of a "time dial" that can launch GRC processes at a specific point in the past, there is no mechanism to collect the identical inputs to these processes that existed at that point in time in the past and then "replay" those processes against those inputs to validate the previous report.

3. No immutability guarantees for time-based compliance inputs—There is no way for an auditor to authenticate that the GRC processes from that time frame are original (i.e., unaltered, immutable) and that the inputs from those time frames are also original.

4. No replay capability—While the Diagnostics 430 capability may assist with current state diagnostics as highlighting the gaps preventing future state compliance, it does not, however, include current state compliance as compared with previous state compliance, which is essential should an auditor arrive on site to inspect the results of a dashboard from many months previous.

5. GRC repository not tied to app deployment framework—While the GRC framework 400 has Technology Platform and Enabling Tools 460 that, among other things, contain a centralized, secure repository for policies, control standards, risk compliance, etc., this repository is separate from governed application deployment frameworks that either (a) originally deploy applications and data in a governed fashion, or (b) migrate applications and data to new locations. This can result in automated application deployment decisions that are made outside of the governance processes contained within the GRC framework 400.

Accordingly, example embodiments of the present invention provide a new approach that not only supports governed replay but can (a) assist an enterprise in quickly diagnosing audit failures, and (b) dynamically audit new or migrated application/data pairs. By combining "governed placement" of application workloads with lineage-based metadata, an enterprise can enable governed replay for an auditor (e.g., wishing to confirm the validity of previous audits) or an employee (e.g., wishing to revisit previous results). This approach can also be used to detect and diagnose changes that resulted in audit failures, as well as integrate with a governed application framework.

As described above, in modern datacenters, application deployment on a cloud infrastructure has been substantially automated by the development and implementation of tools that employ a Platform-as-a-Service (PaaS) approach. One example of such a PaaS approach is implemented in the CloudFoundry product available from Pivotal Software, Inc. of Palo Alto, Calif. which provides application developers with the functionality of a versatile PaaS application deployment layer. One of the main benefits of the PaaS application deployment layer is that, by controlling deployment of an application to a specific platform (e.g., specific data center or cloud), the PaaS application layer abstracts the application developer away from the specific hardware architecture of the data center/cloud where the application is intended to be deployed. This increases development speed and also facilitates speed of deployment for information technology (IT) operators.

Application deployment via a GRC framework may generate infrastructure-level metadata (e.g., the cloud used, the storage used, and the qualifications/capabilities of each). Example embodiments of the present invention may capture the transaction and the generated metadata, save it, and use it as an input to a GRC tool. The GRC tool then, for example, may indicate that the infrastructure is compliant which compliance may be stored as a permanent immutable record in an audit database. While typical GRC tools allow a user to determine compliance at a present point in time, example embodiments of the present invention provide a "time dial" that enables an audit to be performed at a later time using the saved metadata to verify compliance at a selected time (i.e., confirm compliance at the time the GRC tool was originally run). It should be understood that, for a successful audit, results of the audit should match the originally-stored output from the GRC tool being audited.

Figure 5:
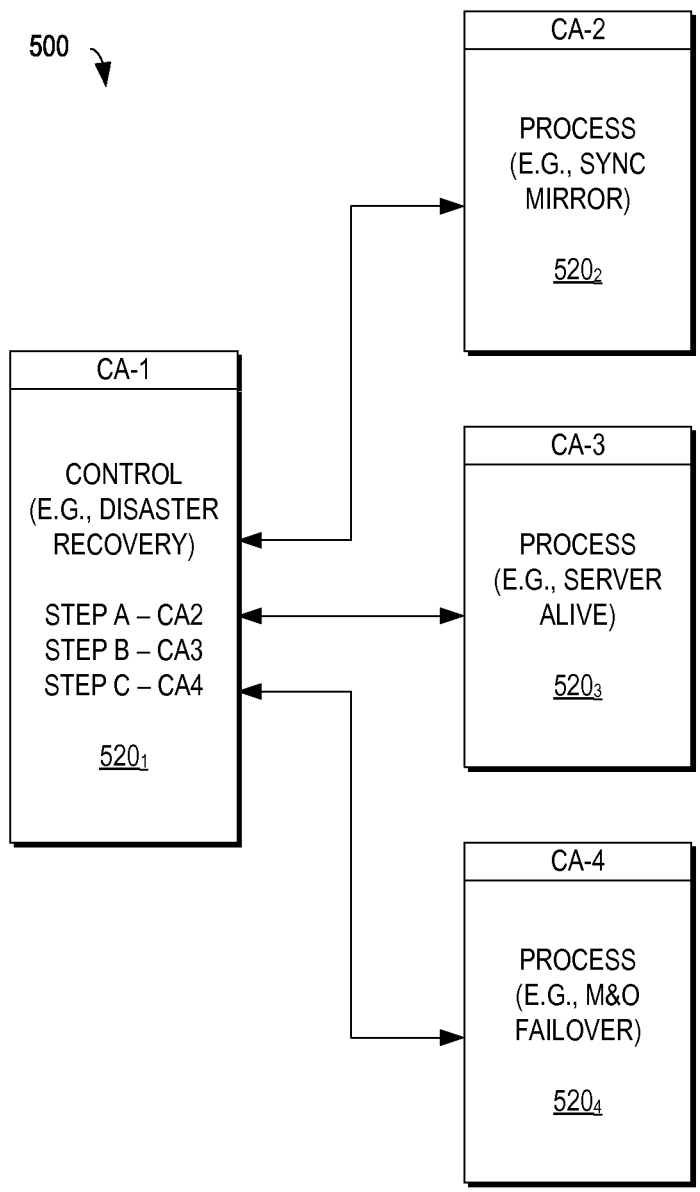
FIG. 5 is a block diagram illustrating relationships between a GRC control and a plurality of processes immutably stored as content-addressable objects according to an example embodiment of the present invention.

FIG. 5 is a block diagram 500 illustrating relationships between items of GRC metadata, including a GRC control $520_1$ and a plurality of processes immutably stored as content-addressable objects $520_2$, $520_3$, $520_4$ having respective content addresses CA-1, CA-2, CA-3, CA-4 according to an example embodiment of the present invention. As illustrated in FIG. 5, example embodiments of the present invention use object storage and content-addressable techniques to augment a GRC framework (e.g., framework 400 of FIG. 4) and, as described in greater detail below, for example, to allow governed replay of point-in-time compliance reporting. Further, as described in greater detail below, other example embodiments allow highlighting of configuration differences in two different point-in-time compliance reports to determine which differences may have caused a compliance failure. Moreover, as described in greater detail below, yet other example embodiments may perform immediate and dynamic audit of newly deployed (or newly migrated) applications.

Object-based storage is described in U.S. patent application Ser. No. 11/864,943 entitled "CONTROLLING ACCESS TO CONTENT ON AN OBJECT ADDRESSABLE STORAGE SYSTEM," Ser. No. 11/933,686 entitled "DETERMINING THE LINEAGE OF A CONTENT UNIT ON AN OBJECT ADDRESSABLE STORAGE SYSTEM," and Ser. No. 13/333,307 entitled "DATA PROVENANCE IN COMPUTING INFRASTRUCTURE," all commonly assigned with the present application to EMC Corporation of Hopkinton, Mass., the teachings of which are incorporated herein by reference in their entirety.

GRC tools (e.g., GRC tools 460 of FIG. 4) will often execute a compliance control $520_1$, which in turn triggers multi-step process $520_2$, $520_3$, $520_4$ execution. The control $520_1$, and the steps $520_2$, $520_3$, $520_4$ within, can be stored in a metadata lake (e.g., metadata lake 110 of FIG. 1) as immutable, content-addressable objects. FIG. 5 shows three immutable processes $520_2$, $520_3$, $520_4$ that have been stored on a content addressable store, generating three unique content addressable hashtags CA-2, CA-3, CA-4 all wrapped in an immutable control $520_1$ that has its own unique hashtag CA-1.

For example, as illustrated in FIG. 5, a GRC user may use a GRC tool (e.g., Archer) to execute a compliance check to determine whether an application is protected via, for example, disaster recovery. Accordingly, the GRC tool may trigger a disaster recovery control $520_1$ (i.e., script) that may check that:

Step A $520_2$—The data set for a given application is currently being synchronously mirrored;
Step B $520_3$—The disaster recovery servers for a given application are online and functional; and
Step C $520_4$—The Management and Orchestration (M&O) framework for failover is online and functional.

Figure 6:
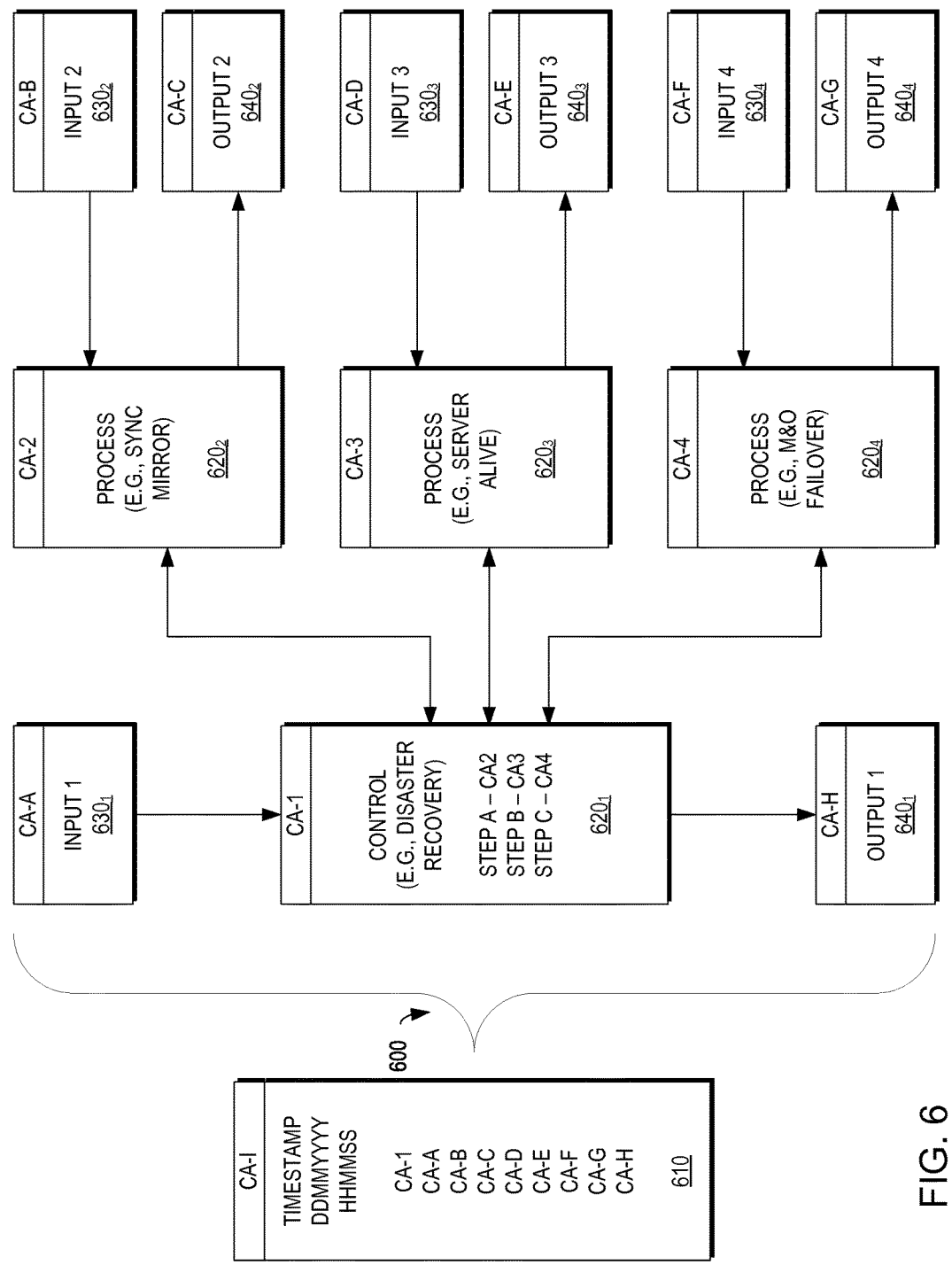
FIG. 6 is a block diagram illustrating relationships between the GRC control and the plurality of processes of FIG. 5 together with their respective inputs and outputs stored as content-addressable objects according to an example embodiment of the present invention.

FIG. 6 is a block diagram illustrating relationships between items of GRC metadata 600, including the GRC control $620_1$ and its plurality of processes $620_2$, $620_3$, $620_4$ (620 generally) (similar to the control $520_1$ and processes $520_2$, $520_3$, $520_4$ of FIG. 5), together with their respective inputs $630_1$, $630_2$, $630_3$, $630_4$ and outputs $640_1$, $640_2$, $640_3$, $640_4$ stored as content-addressable objects having respective content addresses CA-B, CA-C, CA-D, CA-E, CA-F, CA-G according to an example embodiment of the present invention.

As the control $620_1$ calls each process 620, the process 620 runs using metadata (e.g., content metadata 120, infrastructure metadata 125, or application metadata 130 relating to the cloud infrastructure environment 105 of FIG. 1) as an input 630. The inputs 630 may be stored as immutable objects having content addresses CA-B, CA-D, CA-F in, for example, a metadata lake (e.g., metadata lake 110 of FIG. 1). As each process 620 runs, the outputs 640 also may be stored as immutable objects having content addresses CA-C, CA-E, CA-G. Once all processes 620 have completed, the GRC tool may create a metarecord 610 as an immutable record to keep track of the state of the cloud infrastructure environment. The metarecord may be stored as an immutable object having a content address CA-I.

The metarecord 610 may include a timestamp indicating when the control $620_1$ was run on the cloud infrastructure environment, the content address CA-1 of the control $620_1$ that was run (which, in turn, includes the content addresses CA-2, CA-3, CA-4 of the processes $620_2$, $620_3$, $620_4$ called by the control $620_1$) together with the respective content addresses CA-A, CA-B, CA-C, CA-D, CA-E, CA-F, CA-G of the inputs $630_2$, $630_3$, $630_4$ and outputs $640_2$, $640_3$, $640_4$ of those processes 620. Accordingly, the cloud infrastructure environment metadata 620, 630, 640 stored as an immutable metarecord 610 may be used for replay of the GRC processes, such as in the event of an audit of the cloud infrastructure environment.

Figure 7:
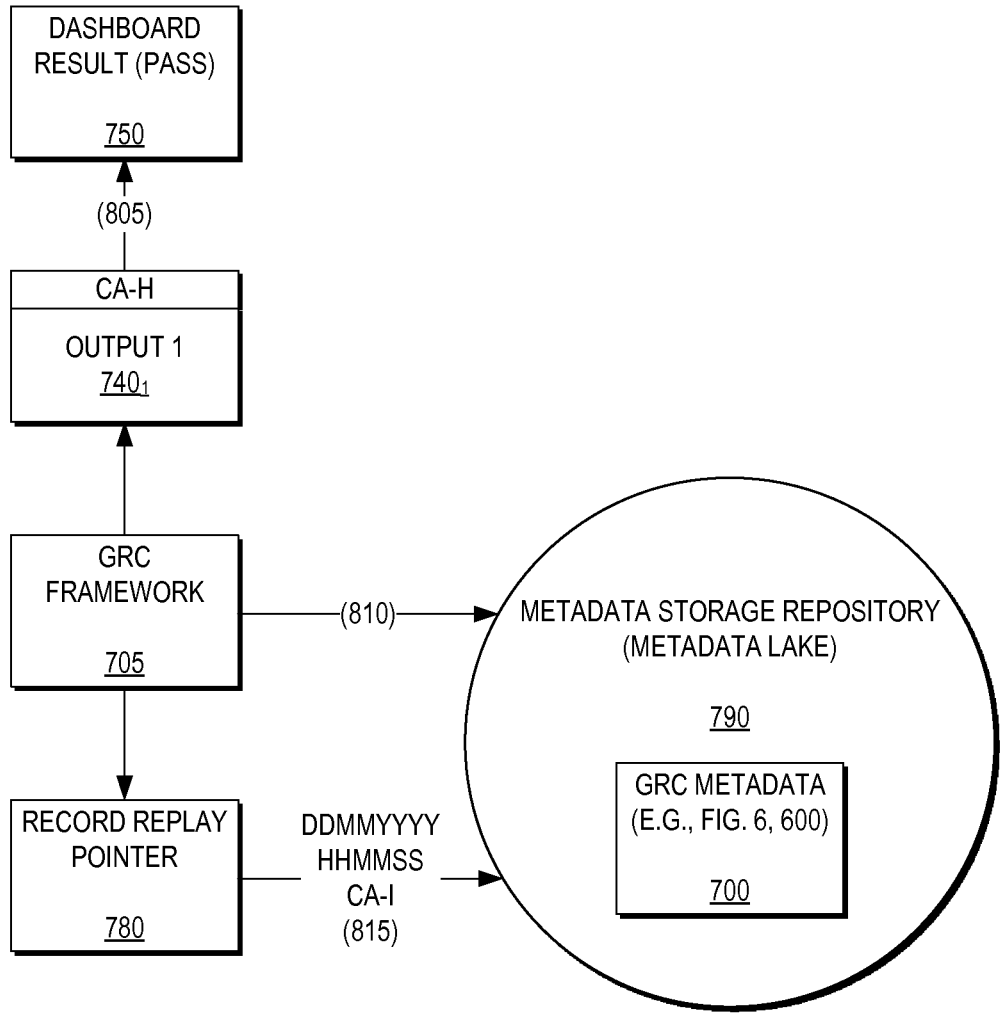
FIGS. 7 and 8 are a block diagram and a flow diagram, respectively, illustrating a method of performing replay-capable GRC functions according to an example embodiment of the present invention.
Figure 8:
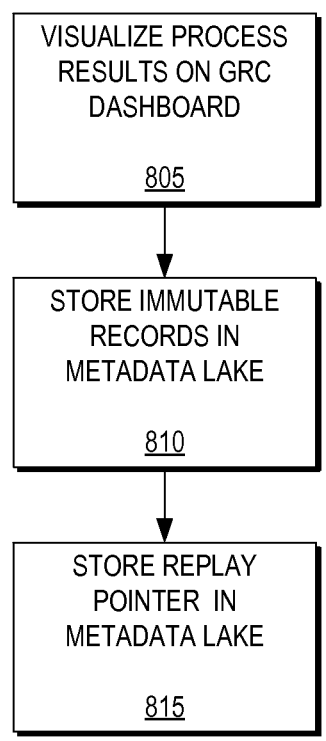

FIGS. 7 and 8 are a block diagram and a flow diagram, respectively, illustrating a method of performing replay-capable GRC functions according to an example embodiment of the present invention. FIGS. 7 and 8 may be described in conjunction.

As illustrated in FIG. 7, and as described above with respect to FIG. 6, the GRC framework 705 via the GRC tool may generate an output 740$_1$ (e.g., output 640$_1$ of FIG. 6) which result (e.g., that the GRC process passed) may be displayed (i.e., visualized) on a GRC tool dashboard 750 (805). The immutable metadata records 700 from the GRC tool (e.g., GRC metadata 600 of FIG. 6 (i.e., control 620$_1$; processes 620$_2$, 620$_3$, 620$_4$, inputs 630$_1$, 630$_2$, 630$_3$, 630$_4$; and outputs 640$_1$, 640$_2$, 640$_3$, 640$_4$) then may be stored with respective content addresses (e.g., CA-1, CA-2, CA-3, CA-4, CA-A, CA-B, CA-C, CA-D, CA-E, CA-F, CA-G, CA-H, CA-I) in a metadata lake 790 (e.g., metadata lake 110 of FIG. 1) (810) and linked via a record replay pointer 780 identifying the metarecord (e.g., metarecord 610 of FIG. 6) which also may be stored to the metadata lake 790 (815). In certain embodiments, the metarecord 610 may be stored in a part of the GRC framework other than the metadata lake 790.

Figure 9:
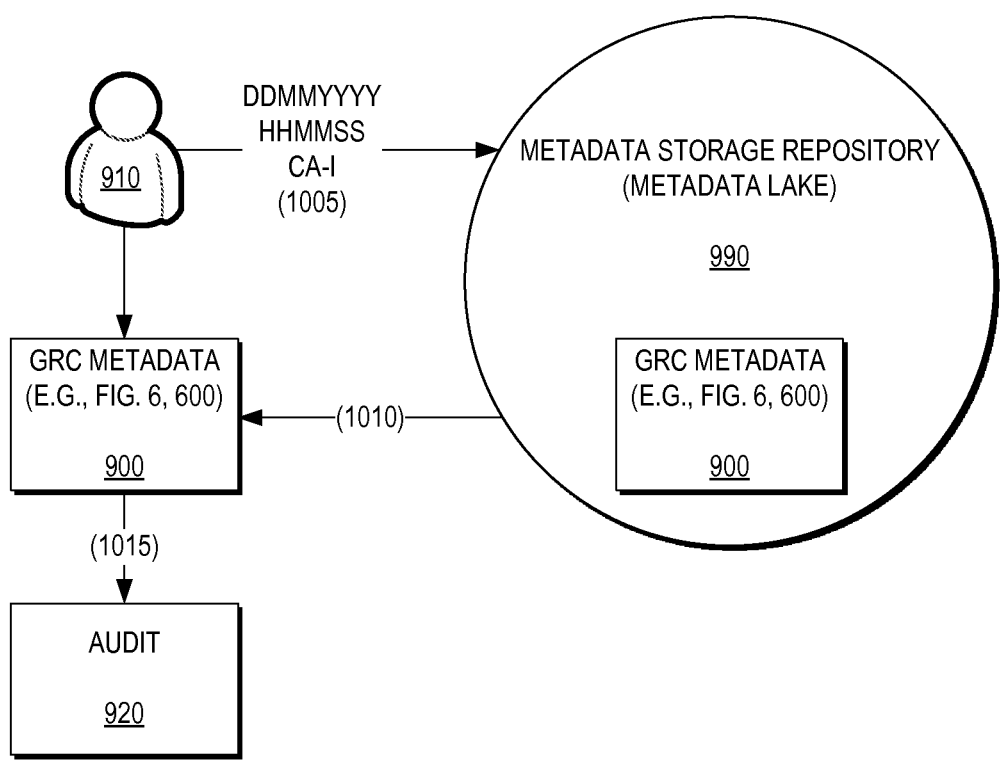
FIGS. 9 and 10 are a block diagram and a flow diagram, respectively, illustrating a method of performing a point-in-time replay of GRC functions, such as for audit purposes, according to an example embodiment of the present invention.
Figure 10:
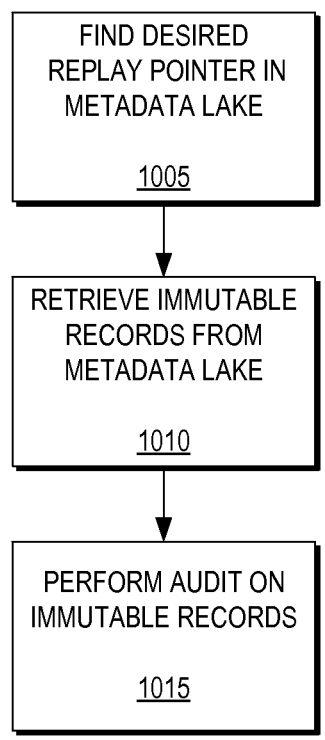

FIGS. 9 and 10 are a block diagram and a flow diagram, respectively, illustrating a method of performing a point-in-time replay of GRC functions, such as for audit purposes, according to an example embodiment of the present invention. FIGS. 9 and 10 may be described in conjunction.

As illustrated in FIG. 9, an auditor 910 (e.g., external or internal employee) may perform an audit to verifying a previous GRC tool dashboard output. First the auditor 910 may search the metadata lake 990 (e.g., metadata lake 110 of FIG. 1) for a desired replay pointer for a desired output (e.g., output 1 640$_1$ of FIG. 6) according to the timestamp of its metarecord (e.g., metarecord 610 of FIG. 6) (1005). Accordingly, the auditor 910 may retrieve the immutable metarecord object according to its content address (e.g., CA-I) embedded in which are the content address pointers to GRC metadata associated with the entire transaction of the previous GRC tool dashboard output (i.e., control, process, inputs, outputs) (e.g., CA-1, CA-A, CA-B, CA-C, CA-D, CA-E, CA-F, CA-G, CA-H). The auditor 910 then may retrieve these immutable GRC metadata records 900 according to their content addresses from the metadata lake (1010) which each may have their own timestamps and checksums that can verify the authenticity and actuality of the execution of the control for that time period. These immutable GRC metadata records then may be input into the GRC tool to replay the previous GRC tool dashboard output via the audit 920 process (1015). The audit 920 may generate a result for the auditor.

Figure 11:
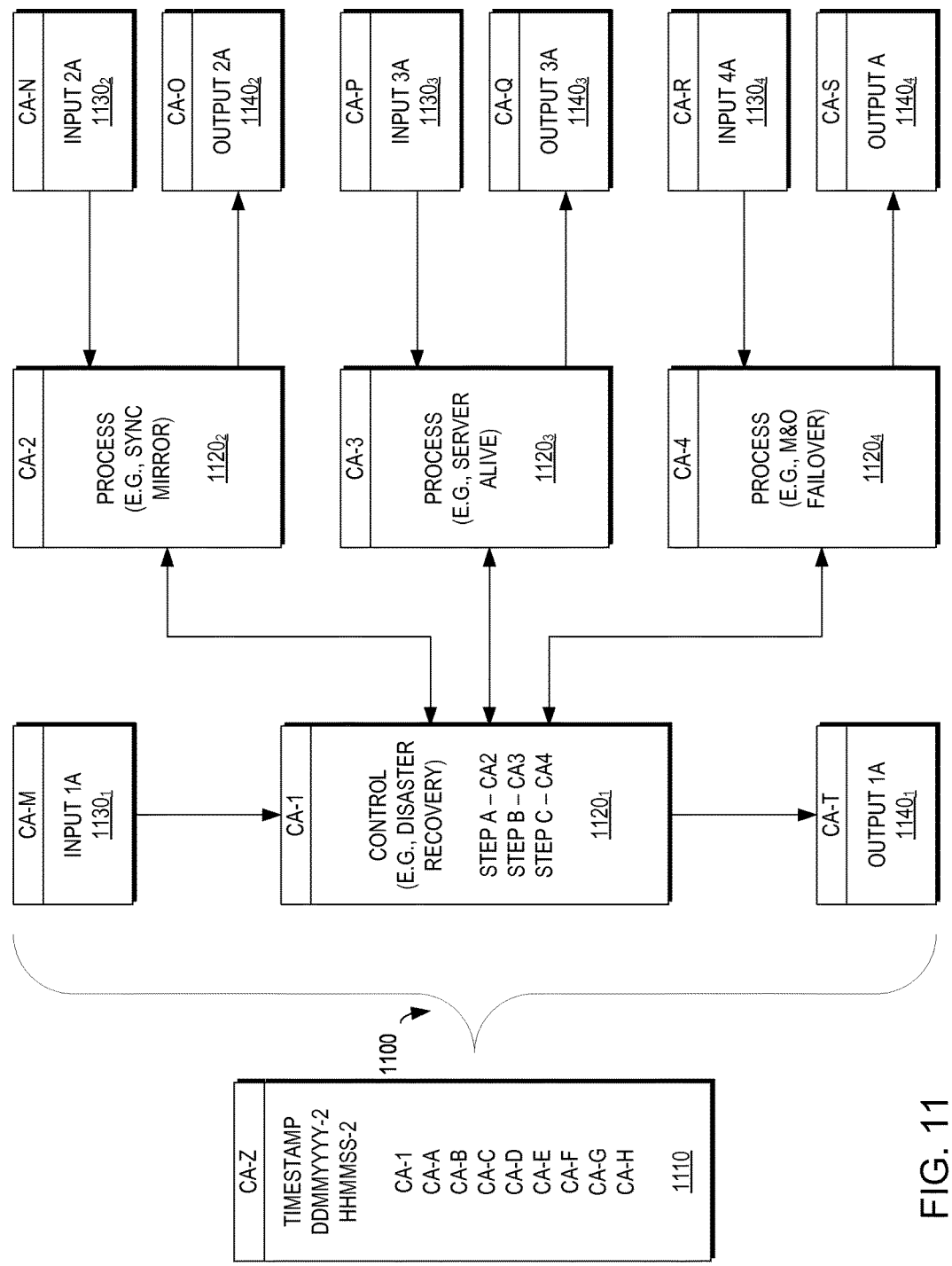
FIG. 11 is a block diagram, similar to and for comparison with the block diagram of FIG. 6, illustrating a GRC failure resulting from different input and output states of the GRC control and processes therefore resulting in different content addresses according to an example embodiment of the present invention.

FIG. 11 is a block diagram, similar to and for comparison with the block diagram of FIG. 6, illustrating a GRC failure resulting from different input 1130$_1$, 1130$_2$, 1130$_3$, 1130$_4$ and output 1140$_1$, 1140$_2$, 1140$_3$, 1140$_4$ states of the GRC control and processes therefore resulting in different respective content addresses CA-M, CA-N, CA-O, CA-P, CA-Q, CA-R, CA-S, CA-T according to an example embodiment of the present invention. It should be noted that the control 1120$_1$ and processes 1120$_2$, 1120$_3$, 1120$_4$ in FIG. 11 are the same as in FIG. 6; however, in other embodiments they may differ.

As illustrated in FIG. 5, the GRC tool is re-run, including the same control CA-1 and processes CA-2, CA-3, CA-4 (e.g., sync mirror, sever alive, M&O failover), but using different inputs (e.g., CA-M, CA-N, CA-P, CA-R) at a different time (e.g., DDMMYYYY-2/HHMMSS-2 in CA-Z) and yielding different outputs (e.g., CA-O, CA-Q, CA-S, CA-T). Accordingly, a user (e.g., auditor 910 of FIG. 9, may compare the results of re-running the GRC tool at a later time (as shown in FIG. 11) with the results of when the GRC tool was originally run (as shown in FIG. 6). In examining the metadata of this example embodiment, the auditor 910 will observe that the same control CA-1 was run as were the same processes CA-2, CA-3, CA-4 but that the control was not run at the same time as the GRC tool originally reported, thereby likely resulting in the GRC tool running on the cloud infrastructure environment being in two different states when the GRC tool was run. Thus, the audit would fail as the state of the cloud infrastructure environment could not be verified via the replay.

Figure 12:
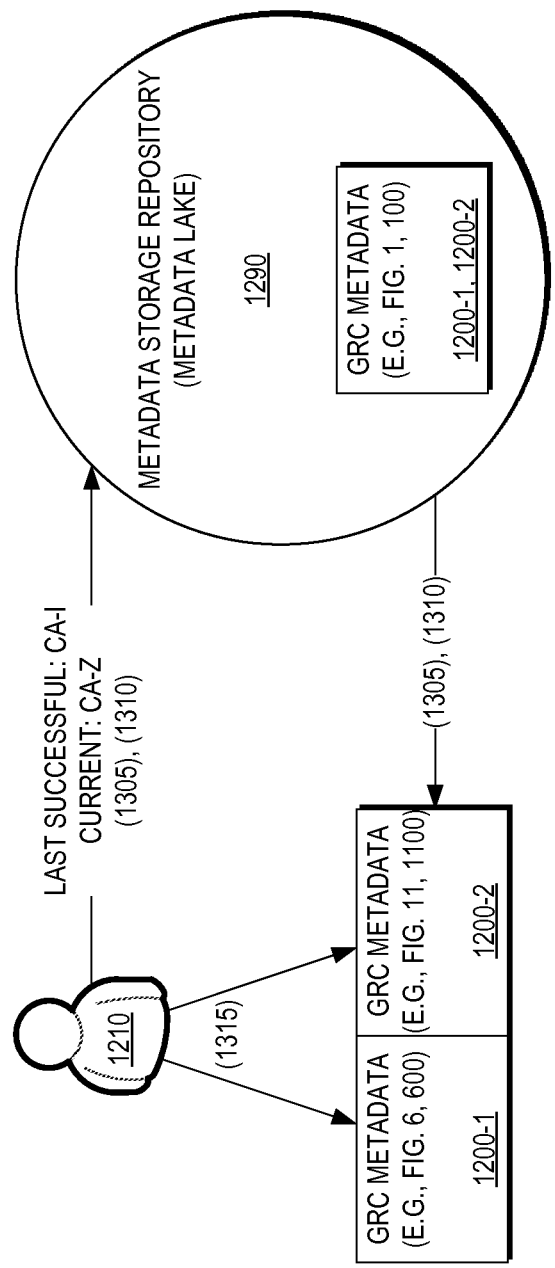
FIGS. 12 and 13 are a block diagram and a flow diagram, respectively, illustrating a method of performing a GRC comparison by comparing metadata associated with the last successful GRC operation with metadata associated with the current failed GRC operation according to an example embodiment of the present invention.
Figure 13:
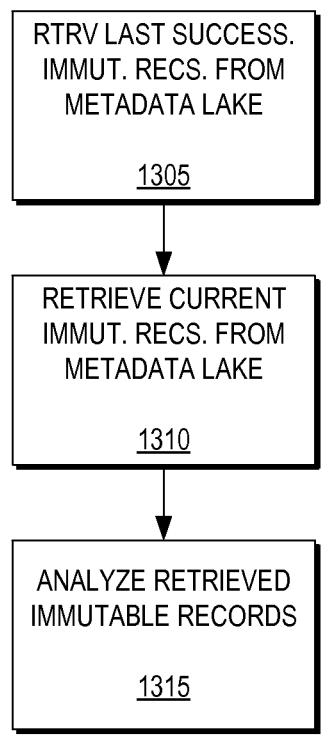

FIGS. 12 and 13 are a block diagram and a flow diagram, respectively, illustrating a method of performing a GRC comparison by comparing metadata associated with the last successful GRC operation 1200-1 (e.g., GRC metadata 600 of FIG. 6) with metadata associated with the current failed GRC operation 1200-2 (e.g., GRC metadata 1100 of FIG. 11) according to an example embodiment of the present invention. According to example embodiments of the present invention, if something in the cloud infrastructure environment goes out of compliance, instead of ad hoc trying to figure it out, a user 1210 (e.g., auditor 910 of FIG. 9) may retrieve the GRC metadata 1200-1 for a previously successful state of the cloud infrastructure environment via its content address CA-I (1305) together with the GRC metadata 1200-2 for the current failed state of the cloud infrastructure environment via its content address CA-Z (1310) from the metadata lake 1290 (e.g., metadata lake 110 of FIG. 1). The user 1210 (e.g., governance contact for an organization) then may analyze and compare the retrieved immutable records 1200-1, 1200-2 to determine a change in state of the cloud infrastructure environment that may be the cause of the failure (1315). For example, a piece of hardware or software may have been upgraded or otherwise changed state. The user 1210 then may take remediation steps (e.g., debugging) to address the failure.

Figure 14:
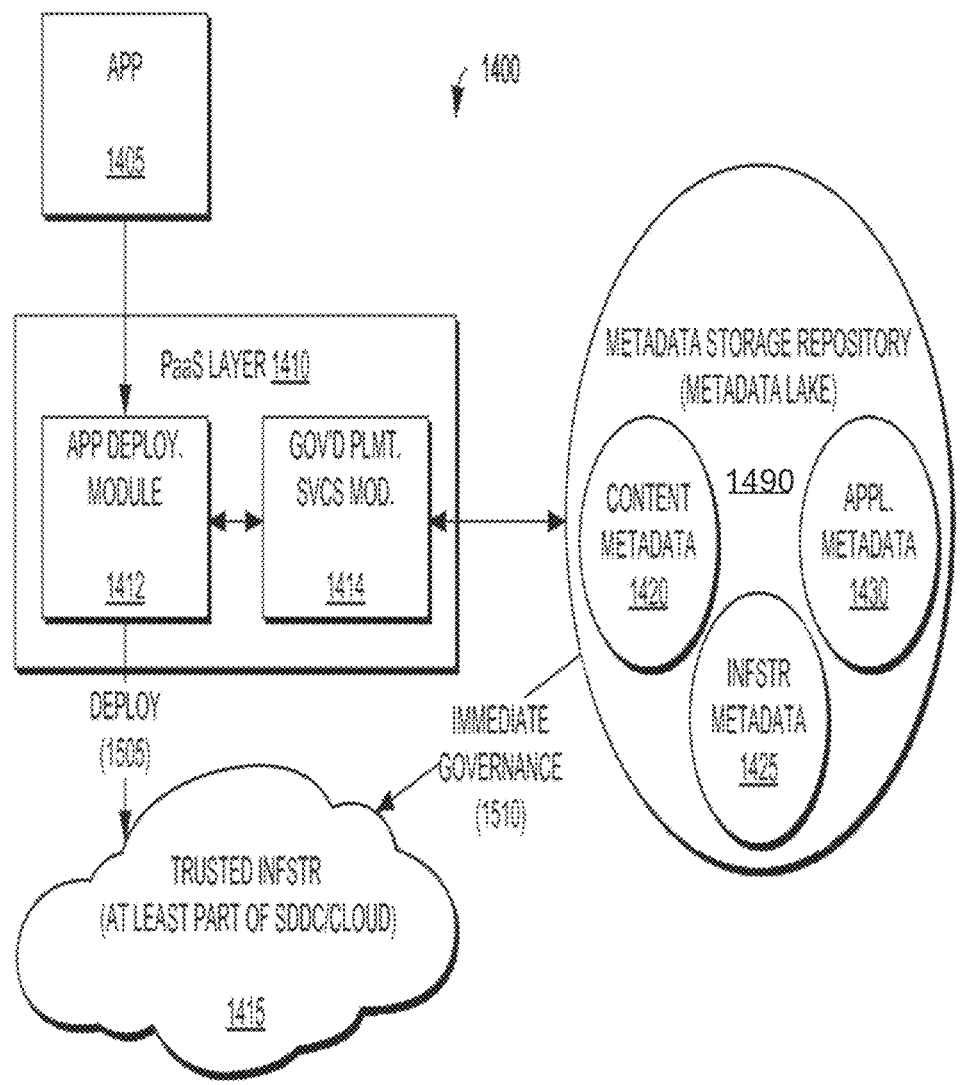
FIGS. 14 and 15 are a block diagram and a flow diagram, respectively, illustrating a method of linking GRC processes to application deployment according to an example embodiment of the present invention.
Figure 15:
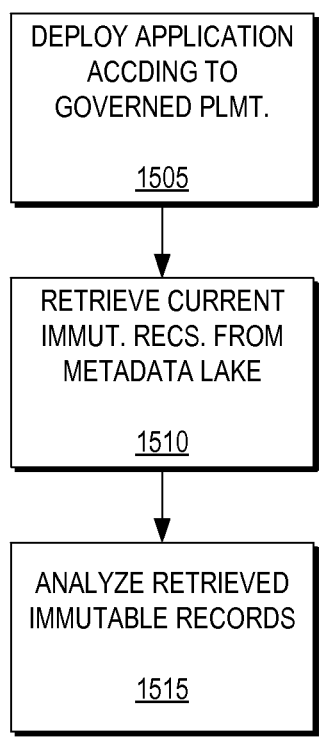

FIGS. 14 and 15 are a block diagram and a flow diagram, respectively, illustrating a method of linking GRC processes to application deployment according to an example embodiment of the present invention. As illustrated in FIG. 14, and as described above with respect to FIG. 3, an automated framework 1400 may use application policies and trusted infrastructure to make compliant placement decisions for applications and data, whether it be for new applications/data or for the migration of existing applications and data. This placement process can by greatly enhanced by linking to the content addressable governance policies that are related to the application being deployed in a governed manner.

As illustrated in FIGS. 14 and 15, an application 1405 may be deployed on a trusted infrastructure 1415 via a Platform-as-a-Service layer 1410 which includes an application deployment module 1412 and a governed placement services module 1414. Metadata generated by the application deployment, including content metadata 1420, infrastructure metadata 1425, and application metadata 1430 may be stored in a metadata lake 1490 (1505). It should be noted that the deployment may be either an application 1405 being first deployed onto the trusted infrastructure 1415 or the application 1405 being moved and redeployed onto the trusted infrastructure 1415.

According to example embodiments of the present invention, because the new application 1405 being deployed in the trusted infrastructure 1415 can be linked to the governance processes that are associated with the new application 1405 and metadata 1420, 1425, 1430 (1510), an automatic audit may be run against the newly deployed application 1405 (1515) to ensure that the deployment was indeed compliant. Therefore, as described above, metadata records for the application deployment may be retrieved from the metadata lake 1490 and immediately run against the deployed application 1405. It should be understood that this check is beneficial to infrastructure operators that wish to "audit the machine" to monitor datacenter automated deployment and managing of applications.

Figure 16:
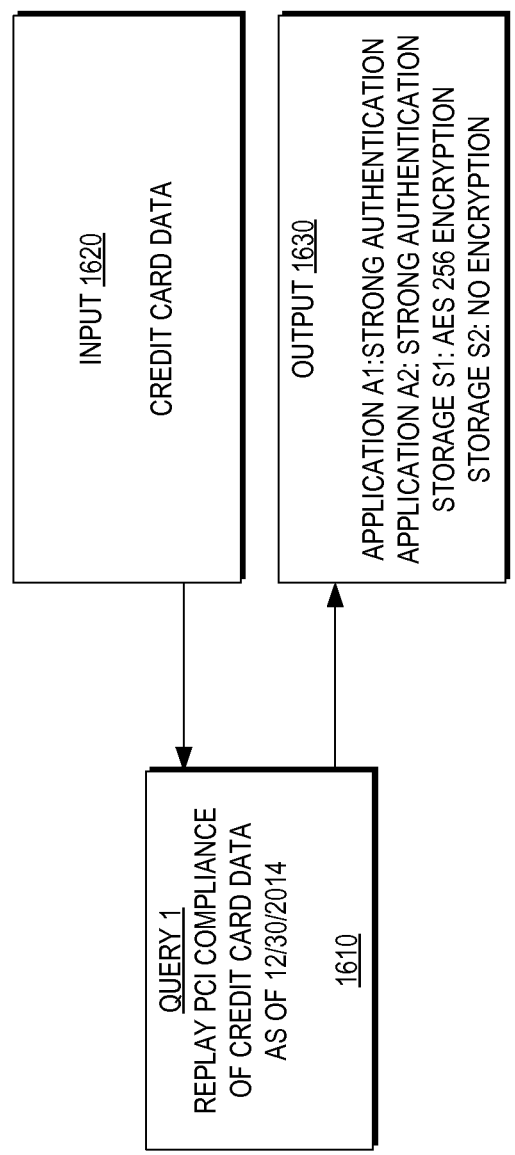
FIG. 16 is a block diagram illustrating GRC replay across content, application, and infrastructure domains according to an example embodiment of the present invention.

FIG. 16 is a block diagram illustrating GRC replay across content, application, and infrastructure domains according to an example embodiment of the present invention. FIG. 16 may be described in conjunction with FIG. 9. As described above, governed application deployment stores metadata from the application domain, the content domain, and the infrastructure domain in the metadata lake. Accordingly, the governed replay according to example embodiments of the present invention capability extends across the three domains and their relationships. This provides a unique ability to start with the context of domain, but have replay visibility across all the related domains. For example: an auditor may query on a business context of PCI compliant Credit Card data, and is able to replay all the infrastructure that hosts the credit card information.

As illustrated in FIG. 16, an auditor 910 may query 1610 whether credit card data 1620 (i.e., content domain) retained by, for example, an online merchant complied with the Payment Card Industry Data Security Standard (PCI DSS) as of Dec. 30, 2014. Accordingly as illustrated in FIG. 9, the auditor may retrieve GRC metadata 900 from the metadata lake 990 and perform an audit reply according to example embodiments of the present invention. Here, as illustrated in FIG. 16, the output 1630 of the audit indicates a governance failure as, although applications A1 and A2 (i.e., application domain) both provide strong authentication requirements for accessing the credit card data (i.e., content domain), and storage S1 (i.e., infrastructure domain) provides AES 256 encryption, storage S1 (i.e., infrastructure domain) provides no encryption in violation of the governance standard required by, for example, PCI DSS.

As described above, the point-in-time replay results (e.g., output 1A 1140₁ of FIG. 11) are an immutable record of a previous process audit. However, it should be understood that these results can be copied into a separate sandbox and altered to run "what-if" scenarios and simulate different cloud infrastructure environment states and test for projected compliance in these states without actually setting up the tested cloud infrastructure environment state and migrating the audited application to the new environment. Further, such "what-if" scenarios may be enriched by combining historical (e.g., daily and streamed) events and data as well as simulation models. For example: a Chief Data Architect within an organization may be considering migrating an application archive to a Hybrid Cloud with certain availability and encryption capabilities. Replaying such a "what-if" scenario can flag alerts tied to the rules embedded in the data hosted by the application.

Yet other embodiments may track performance. It should be understood that the governed replays may be applied for performance diagnostics and forensics which typically are hard to infer due to the complex relationships in the datacenter and point of time nature of the events. Governed replays, however, having a cross domain relationship established in the metadata lake, reduce the difficulty of such diagnostics. For example: a sudden slowdown in an application's performance at a particular date and time may be related to a change in infrastructure configuration. Such infrastructure configuration changes may be tracked via governed replay. Similarly, point in time changes may be tracked for forensics as well to understand who did what, when.

Figure 17:
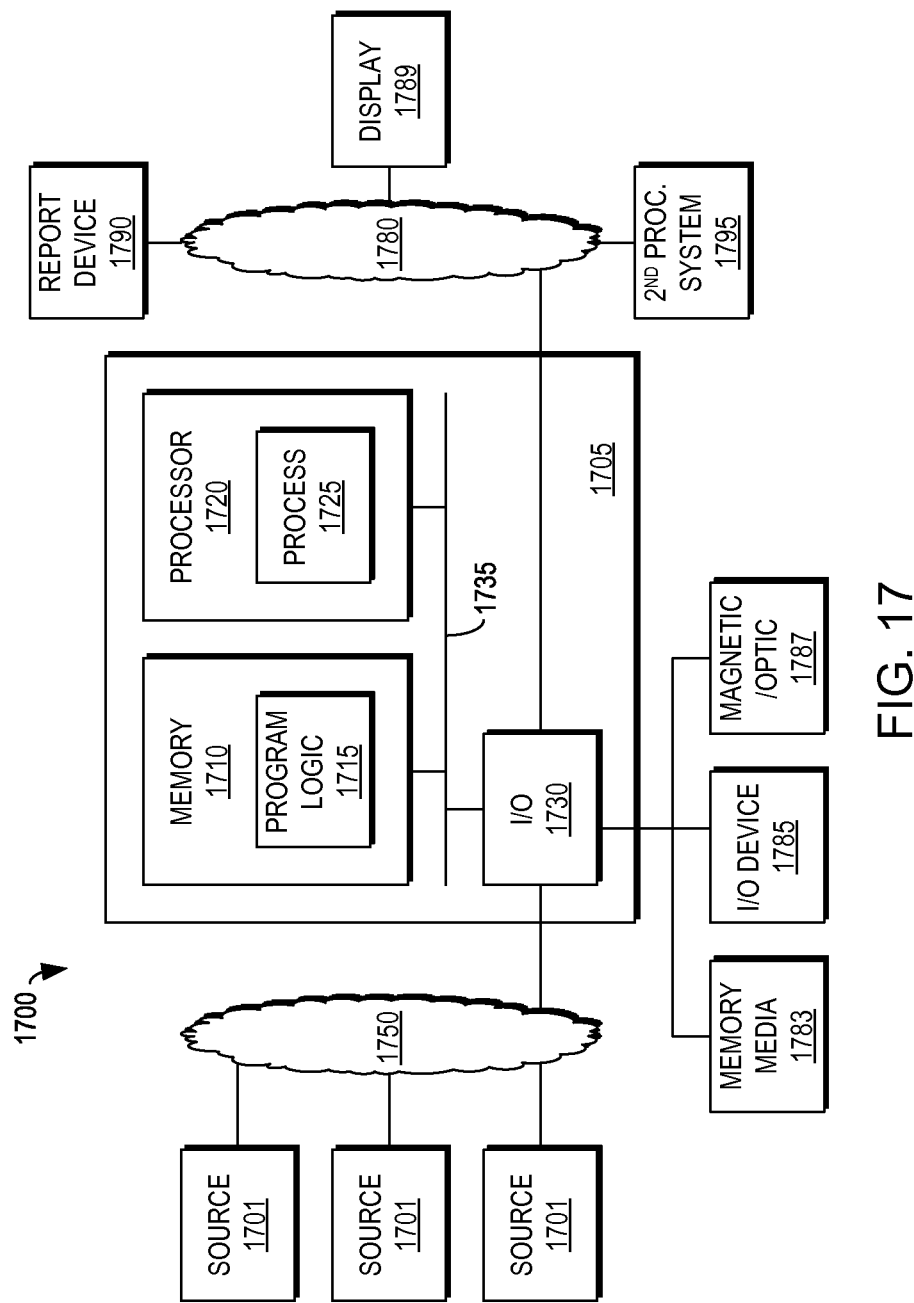
FIG. 17 is a block diagram of an apparatus according to an example embodiment of the present invention.

FIG. 17 is a block diagram of an example embodiment apparatus 1705 according to the present invention. The apparatus 1705 may be part of a system 1700 and includes memory 1710 storing program logic 1715, a processor 1720 for executing a process 1725, and a communications I/O interface 1730, connected via a bus 1735. The communications I/O interface 1730 may provide connectivity to memory media 1783, I/O device 1785, and drives 1787, such as a magnetic or optical drives. The apparatus 1705 is configured to communicate with a plurality of sources 1701 via a network 1750 using the communications I/O interface 1730. Apparatus 1705 is further configured to communicate with a display 1789, a report device 1790, and a second processing system 1795 via a network 1780 using the communications I/O interface 1730.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 18:
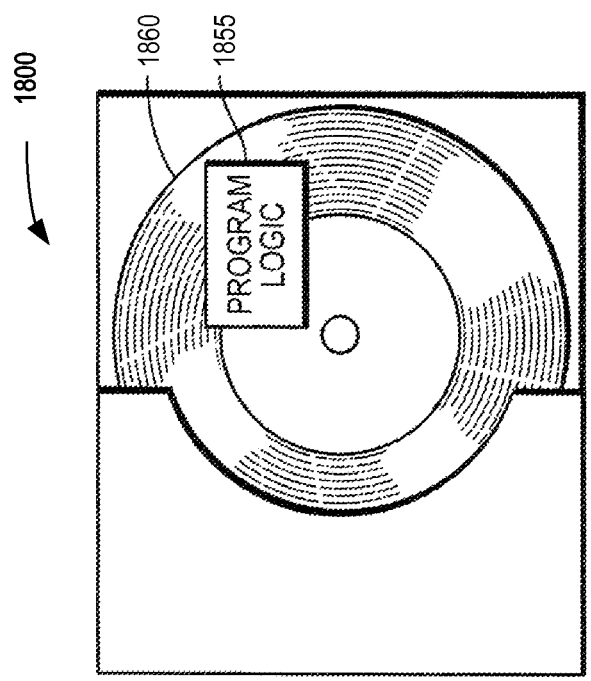
FIG. 18 is a block diagram of an example embodiment of the present invention embodied in computer program code.

FIG. 18 is a block diagram of a computer program product 1800 including program logic 1855, encoded on a computer-readable medium 1860 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer-implemented method for performing point-in-time replay using software control metadata objects to validate compliance of a cloud infrastructure environment at a specific time comprising:

maintaining a repository of metadata associated with computer software applications, metadata associated with content associated with the computer software applications, and metadata associated with the cloud infrastructure environment enabled to deploy the computer software applications, wherein the cloud infrastructure environment includes a shared pool of configurable computing resources, further wherein the shared pool of configurable computing resources includes the computer software applications, a plurality of servers, and at least one storage repository, wherein the at least one storage repository includes the metadata associated with computer software applications, the metadata associated with content associated with the computer software applications, and the metadata associated with the cloud infrastructure environment;

executing a point-in-time replay, including a control and one or more processes, on the cloud infrastructure environment to determine compliance of a state of the cloud infrastructure environment at the specific time according to a plurality of inputs maintained in the repository of metadata regarding the state of the cloud infrastructure environment, wherein the compliance indicates whether the pool of configurable computing resources within the cloud infrastructure environment satisfy a set of technical specifications at the specific time based on trust-based criteria;

storing a control metadata object generated by the executed point-in-time replay, the control metadata object identifying the control and including content addresses to the processes for the point-in-time replay as immutable control and process objects, respectively, in the repository;

storing input metadata objects and output metadata objects identifying inputs to and outputs from the control and the processes as immutable input metadata objects and output metadata objects, respectively, in the repository, wherein the output metadata objects are generated by the executed point-in-time replay;

storing a timestamp metadata object generated by the executed point-in-time replay, the timestamp metadata object including a timestamp and content addresses to the control object, the process objects, the input objects, and the output objects, as an immutable metadata object in the repository; and creating a metarecord, the metarecord including a timestamp, a content address of the control metadata object, and one or more content addresses of the inputs;

storing the metarecord as an immutable object having a metarecord content address;

analyzing whether the state of the shared pool of configurable computing resources are in a trusted state at the time identified in the timestamp metadata object according to a replay of the control and processes metadata objects using the input metadata objects;

determining a deployment for a given one of the computer software applications on a trusted infrastructure within the cloud infrastructure environment based on at least a subset of the metadata maintained in the metadata repository; and causing deployment of the given one of the computer software applications on the trusted infrastructure.

2. The method of claim 1 wherein the analyzing comprises:

fetching the control, process, input, and output metadata objects by the content addresses identified in the timestamp metadata object.

3. The method of claim 2 wherein confirming compliance of the state of the cloud infrastructure environment at the time identified in the timestamp metadata object according to a replay of the control and processes metadata object using the input metadata objects comprises executing the point-in-time replay on the cloud infrastructure environment according to the control and processes metadata objects and the input metadata objects.

4. The method of claim 1 further comprising:

recording information describing the deployment in the metadata repository;

wherein executing a point-in-time replay, including a control and one or more processes, on the cloud infrastructure environment to determine compliance of a state of the cloud infrastructure environment according to a plurality of inputs maintained in the repository of metadata regarding the state of the cloud infrastructure environment comprises immediately executing the point-in-time replay to determine compliance of the deployment of the application.

5. The method of claim 4 wherein deploying the given application on the trusted infrastructure comprises:

receiving a request to deploy the given application; and calling a governed placement service which queries the metadata repository for information to determine the trusted portion of the cloud infrastructure on which to deploy the given application.

6. The method of claim 4 wherein the control, processes, input, and outputs include respective content addressable timestamps and checksums, the method comprising verifying authenticity of the execution of the control via the time recorded in the timestamp metadata object.

7. The method of claim 4 wherein the deployment of the given application is associated with a migration of the application and its data.

8. The method of claim 1 further comprising:

executing a subsequent point-in-time replay producing a failure regarding compliance of a subsequent state of the cloud infrastructure environment;

identifying the timestamp metadata object as associated with a point-in-time replay having a last known compliant state of the cloud infrastructure environment;

performing governed replay of the point-in-time replay according to the timestamp metadata object; and comparing one or more of control, process, input, and output metadata objects to determine a cause of the failure.

9. The method of claim 8 wherein identifying the timestamp metadata object as associated with a point-in-time replay having a last known compliant state of the cloud infrastructure environment comprises querying the metadata repository to discover information describing existing deployments of one or more computer software applications on one or more portions of the trusted infrastructure.

10. The method of claim 8 wherein executing a subsequent point-in-time replay producing a failure regarding compliance of a subsequent state of the cloud infrastructure environment comprises identifying a performance issue with one or more of the computer software applications, content, or cloud infrastructure environment.

11. The method of claim 1 wherein the point-in-time replay comprises a plurality of domains selected from application, content, and infrastructure domains, wherein a query for the point-in-time replay is in a first domain, and wherein a result of execution of the point-in-time replay is in a second domain.

12. The method of claim 1
wherein the repository includes metadata associated with one or more of a hypothetical application, metadata associated with hypothetical content associated with the hypothetical application, and metadata associated with a hypothetical state of the cloud infrastructure environment; and
wherein executing a point-in-time replay, including a control and one or more processes, on the cloud infrastructure environment to determine compliance of a state of the cloud infrastructure environment according to a plurality of inputs maintained in the repository of metadata regarding the state of the cloud infrastructure environment comprises executing a hypothetical point-in-time replay according to the hypothetical metadata to determine an expected state of the cloud infrastructure environment resulting from the hypothetical application, content, or infrastructure.

13. The method of claim 1 wherein the cloud infrastructure environment comprises a platform-as-a-service layer configured to abstract cloud infrastructure and to enable a user to deploy the given application in a portion of the cloud infrastructure.

14. The method of claim 13 wherein the cloud infrastructure comprises one or more software defined data centers each comprises one or more clouds.

15. The method of claim 1 further comprising assigning unique identifiers to entities for which metadata is maintained in the metadata repository.

16. The method of claim 15 wherein at least a portion of the entities comprises computer software applications and data sets associated with the computer software applications.

17. The method of claim 16 further comprising using the unique identifiers as search keys to access information maintained in the metadata repository.

18. A computer system for performing point-in-time replay using software control metadata objects to validate compliance of a cloud infrastructure environment at a specific time comprising:
a cloud infrastructure environment;
a repository of metadata associated with computer software applications, metadata associated with content associated with the computer software applications, and metadata associated with the cloud infrastructure environment enabled to deploy the computer software applications, wherein the cloud infrastructure environment includes a shared pool of configurable computing resources, further wherein the shared pool of configurable computing resources includes the computer software applications, a plurality of servers, and at least one storage repository, wherein the at least one storage repository includes the metadata associated with computer software applications, the metadata associated with content associated with the computer software applications, and the metadata associated with the cloud infrastructure environment;
one or more processors operatively coupled to one or more memories configured to:
maintain the repository of metadata;
execute a point-in-time replay, including a control and one or more processes, on the cloud infrastructure environment to determine compliance of a state of the cloud infrastructure environment at the specific time according to a plurality of inputs maintained in the repository of metadata regarding the state of the cloud infrastructure environment, wherein the compliance indicates whether the pool of configurable computing resources within the cloud infrastructure environment satisfy a set of technical specifications at the specific time based on trust-based criteria;
store a control metadata object generated by the executed point-in-time replay, the control metadata object identifying the control and including content addresses to the processes for the point-in-time replay as immutable control and process objects, respectively, in the repository;
store input metadata objects and output metadata objects identifying inputs to and outputs from the control and the processes as immutable input metadata objects and output metadata objects, respectively, in the repository, wherein the output metadata objects are generated by the executed point-in-time replay;
store a timestamp metadata object generated by the executed point-in-time replay, the timestamp metadata object including a timestamp and content addresses to the control object, the process objects, the input objects, and the output objects, as an immutable metadata object in the repository; and
create a metarecord, the metarecord including a timestamp, a content address of the control metadata object, and one or more content addresses of the inputs;
store the metarecord as an immutable object having a metarecord content address;
analyze whether the state of the shared pool of configurable computing resources are in a trusted state at the time identified in the timestamp metadata object according to a replay of the control and processes metadata objects using the input metadata objects;
determine a deployment for a given one of the computer software applications on a trusted infrastructure within the cloud infrastructure environment based on at least a subset of the metadata maintained in the metadata repository; and
cause deployment of the given one of the computer software applications on the trusted infrastructure.

19. A computer program product including a non-transitory computer readable storage medium having computer program code encoded thereon that when executed on a processor of a computer performs point-in-time replay using software control metadata objects to validate compliance of a cloud infrastructure environment at a specific time comprising:
computer program code for maintaining a repository of metadata associated with computer software applications, metadata associated with content associated with the computer software applications, and metadata associated with a cloud infrastructure environment enable to deploy the computer software applications, wherein the cloud infrastructure environment includes a shared pool of configurable computing resources, further wherein the shared pool of configurable computing resources includes the computer software applications, a plurality of servers, and at least one storage repository, wherein the at least one storage repository includes the metadata associated with computer software applications, the metadata associated with content associated with the computer software applications, and the metadata associated with the cloud infrastructure environment;

computer program code for executing a point-in-time replay, including a control and one or more processes, on the cloud infrastructure environment to determine compliance of a state of the cloud infrastructure environment according to a plurality of inputs maintained in the repository of metadata regarding the state of the cloud infrastructure environment, wherein the compliance indicates whether the pool of configurable computing resources within the cloud infrastructure environment satisfy a set of technical specifications at the specific time based on trust-based criteria;

computer program code for storing a control metadata object generated by the executed point-in-time replay, the control metadata object identifying the control and including content addresses to the processes for the point-in-time replay as immutable control and process objects, respectively, in the repository;

computer program code for storing input metadata objects and output metadata objects identifying inputs to and outputs from the control and the processes as immutable input metadata objects and output metadata objects, respectively, in the repository, wherein the output metadata objects are generated by the executed point-in-time replay;

computer program code for storing a timestamp metadata object generated by the executed point-in-time replay, the timestamp metadata object including a timestamp and content addresses to the control object, the process objects, the input objects, and the output objects, as an immutable metadata object in the repository; and computer program code for creating a metarecord, the metarecord including a timestamp, a content address of the control metadata object, and one or more content addresses of the inputs;

computer program code for storing the metarecord as an immutable object having a metarecord content address;

computer program code for analyzing whether the state of the shared pool of configurable computing resources are in a trusted state at the time identified in the timestamp metadata object according to a replay of the control and processes metadata objects using the input metadata objects;

computer program code for determining a deployment for a given one of the computer software applications on a trusted infrastructure within the cloud infrastructure environment based on at least a subset of the metadata maintained in the metadata repository; and computer program code for causing deployment of the given one of the computer software applications on the trusted infrastructure.

20. The computer system of claim 18 wherein the analyzing by the one or more processors operatively coupled to one or more memories further comprises fetching the control, process, input, and output metadata objects by the content addresses identified in the timestamp metadata object.

* * * * *